United States Patent
Li et al.

(10) Patent No.: US 10,234,953 B1
(45) Date of Patent: Mar. 19, 2019

(54) CROSS-DEVICE INTERACTION THROUGH USER-DEMONSTRATED GESTURES

(71) Applicant: Google Inc., Mountain View, CA (US)

(72) Inventors: Yang Li, Mountain View, CA (US); Xiang Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 752 days.

(21) Appl. No.: 14/865,120

(22) Filed: Sep. 25, 2015

(51) Int. Cl.
*G06F 3/01* (2006.01)
*G06F 3/0484* (2013.01)
*G06F 3/14* (2006.01)

(52) U.S. Cl.
CPC .......... *G06F 3/017* (2013.01); *G06F 3/04847* (2013.01); *G06F 3/1423* (2013.01)

(58) Field of Classification Search
CPC ..... G06F 3/017; G06F 3/04847; G06F 3/1423
See application file for complete search history.

(56) References Cited

U.S. PATENT DOCUMENTS

| | | | | |
|---|---|---|---|---|
| 8,854,433 | B1* | 10/2014 | Rafii | G06F 3/017 348/42 |
| 9,507,561 | B2* | 11/2016 | Mckiel, Jr. | G06F 3/167 |
| 2013/0227418 | A1* | 8/2013 | Sa | G06F 3/0488 715/728 |
| 2013/0275138 | A1* | 10/2013 | Gruber | G10L 13/00 704/260 |
| 2014/0240539 | A1* | 8/2014 | Hayward | G06T 3/0093 348/231.6 |
| 2014/0258880 | A1* | 9/2014 | Holm | H04L 65/40 715/748 |
| 2015/0029095 | A1* | 1/2015 | Gomez | G06F 3/017 345/156 |
| 2016/0357431 | A1* | 12/2016 | Aghaei | G06F 3/04883 |

FOREIGN PATENT DOCUMENTS

WO    2013104570    7/2013

OTHER PUBLICATIONS

Dey, A.K., Hamid R., Beckmann, C., Li, I., & Hsu, D., "a CAPpella: programming by demonstration of context-aware applications", In Proceedings of the SIGCHI conference on Human factors in computing systems, ACM, Apr. 1, 2004, pp. 33-40.
Eagan, J.R., Beaudouin-Lafon, M., & Mackay, W.E., "Cracking the cocoa nut: user interface programming at runtime", In Proceedings of the 24th annual ACM symposium on User interface software and technology, Oct. 1 2011, pp. 225-234.

(Continued)

*Primary Examiner* — Anil K Bhargava
(74) *Attorney, Agent, or Firm* — Shumaker & Sieffert, P.A.

(57) ABSTRACT

A method includes identifying a user interface (UI) action demonstrated by a user for an application (104) executed at a first electronic device (102) and identifying a gesture demonstrated by a user using a second electronic device (108, 109, 110) as a gesture intended by the user to trigger the UI action for the application at the first electronic device. In response to detecting a subsequent instance of the gesture at the second electronic device, the method includes triggering an instance of the UI action for the application at the first electronic device.

15 Claims, 10 Drawing Sheets

(56) References Cited

OTHER PUBLICATIONS

Lu, H. & Li, Y., "Gesture coder: a tool for programming multi-touch gestures by demonstration", In Proceedings of the SIGCHI Conference on Human Factors in Computing Systems, ACM, May, 1, 2012, pp. 2875-2884.

Olsen, D.R., & Halversen, B.W., "Interface usage measurements in a user interface management system", In Proceedings of the 1st annual ACM SIGGRAPH symposium on User Interface Software, Jan. 1, 1988, pp. 102-108.

Ruiz, J., Li, Y., & Lank, E., "User-defined motion gestures for mobile interaction", In Proceedings of the SIGCHI Conference on Human Factors in Computing Systems, May 1, 2011, pp. 197-206.

Hartmann, B., Abdulla, L., Mittal, M., & Klemmer, S.R., "Authorinng sensor-based interactions by demonstration with direct manipulation and pattern recognition", In Proceedings of the SIGCHI conference on Human factors in computing systems, Apr. 1, 2007, pp. 145-154.

Schmidt, Dominik, Seifet, J., Rukzio, E., & Gellersen, H. "A cross-device interaction style for mobiles and surfaces", Proceedings of the Designing Interactive Systems Conference. ACM, Jun. 1, 2012, pp. 318-327.

Bragdon, A. DeLine, R. Hinckley, K. & Morris, M.R., "Code space: touch + air gesture hybrid interactions for supporting developer meetings", In Proceedings of the ACM International Conference on Interactive Tabletops and Surfaces, Nov. 1, 2011, pp. 212-221.

Gilles, B., Vo, D.B., Lecolinet, E., & Guiard, Y., "Gesture-aware remote controls: guidelines and interaction techniques", In ICMI'11: 13th International Conference on Multimodal Interaction, Nov. 1, 2011, pp. 263-270.

Merrill, David J., Joseph A. Paradiso, "Personalization, Expressivity, and Learnability of an Implicit Mapping Strategy for Physical Interfaces", Proceedings of the CHI Conference on Human Factors in Computing Systems, Extended Abstracts, Apr. 1, 2005, pp. 2125-2161.

Yang, J., & Wigdor, D. "Panelrama: enabling easy specification of a cross-device web applications", In Proceedings of the SIGCHI Conference on Human Factors in Computing Systems, Apr. 1, 2014, pp. 2783-2792.

Rubine, "The Automatic Recognition of Gestures", Carnegie Mellon University, Dec. 1991, 285 pp.

Rubine, "Specifying Gestures by Example", Computer Graphics, vol. 25, No. 4, Jul. 1991, 9 pp.

* cited by examiner

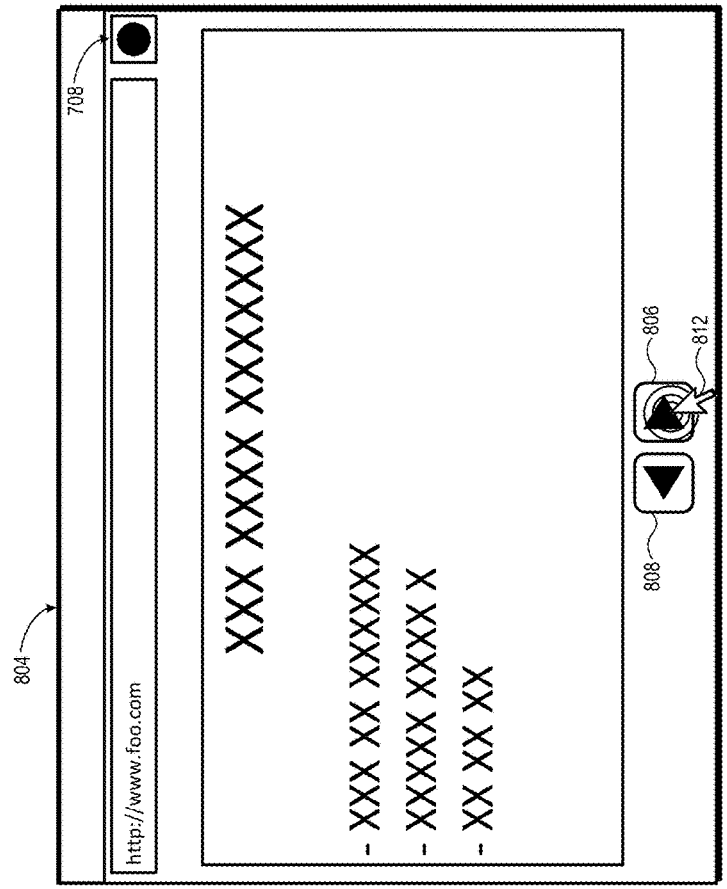
FIG. 8
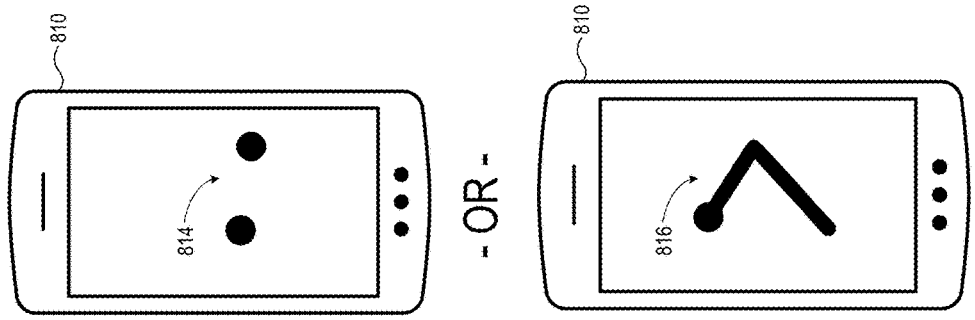

US 10,234,953 B1

CROSS-DEVICE INTERACTION THROUGH USER-DEMONSTRATED GESTURES

BACKGROUND

Field of the Disclosure

The present disclosure relates generally to providing user input to an application and, more particularly, providing user input to an application through cross-device interactions.

Description of the Related Art

The proliferation of mobile and wearable devices has motivated cross-device interactions in which a user's manipulation of one device is used to provide input or control of another device. However, conventional attempts at cross-device interaction have been stymied by at least two challenges. For one, many, if not most, existing applications were not developed with cross-device interaction in mind, and thus many conventional cross-device implementations with such applications involve modifying or rewriting the source code of the application, which is a costly and complex endeavor. Further, most conventional cross-device interaction approaches are similar to remote controllers in that they provide a pre-defined mapping of user manipulations of one device and the corresponding input or actions triggered at another device. That is, such implementations provide only a limited, fixed set of user interface actions that may be triggered by a user via another device, and the manner in which the user triggers one of these user interface actions is also pre-defined. This approach limits the user's flexibility in using one device to control user interface actions at another device in a way that is most intuitive to that particular user.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 8 is a diagram illustrating an example user demonstration of a UI action having zero degrees of freedom and a corresponding user demonstration of a gesture to be mapped to the UI action in accordance with at least one embodiment of the present disclosure.

DETAILED DESCRIPTION

FIGS. 1-10 illustrate example systems and techniques for facilitating cross-device interaction between two or more electronic devices in a manner intuitive to the particular user. In at least one embodiment, the user defines both the user interface (UI) action to be emulated or otherwise performed at an application executed at one device (hereinafter, "the primary device"), as well as the gesture performed at another device (hereinafter, "the accessory device") that is intended by the user to trigger emulation or other execution of the UI action. A cross-device interface module, which may be implemented at the primary device, the accessory device, a remote server, or some combination thereof, analyzes the user-demonstrated UI action to determine a UI action model that represents the parameters to be extracted from the corresponding gesture, as well as the sequence of UI input events to be injected, dispatched, or otherwise simulated to emulate the UI action. The cross-device interface module also analyzes the sensor data generated by gesture-related sensors of the accessory device during the demonstration of the gesture to identify the intended gesture, and from this identified gesture maps one or more parameters, or properties, of the gesture to corresponding parameters of the UI action model. As such, during subsequent instances of the gesture as performed by the user, values for the identified parameters of that instance of the gesture may be used to define the values for the identified parameters of the UI action model for the resulting emulated instance of the UI action.

By enabling the user to define through demonstration both the UI action to be performed at the primary device and the gesture at the accessory device that is to trigger the performance of the UI action, the user is provided the flexibility to improvise a cross-device interaction that is most intuitive to that particular user. Moreover, in at least one embodiment, performance of the UI event in response to detection of the corresponding user-defined gesture is implemented via emulation of the UI action through dispatch of a sequence of one or more injected or otherwise simulated UI input events that emulate the user's manipulation of a keyboard, mouse, touchscreen, or other user interface device. As such, this cross-device interaction approach may be implemented with existing applications without the need to modify or otherwise adapt the source code of the application to enable performance of the UI action.

Figure 1:
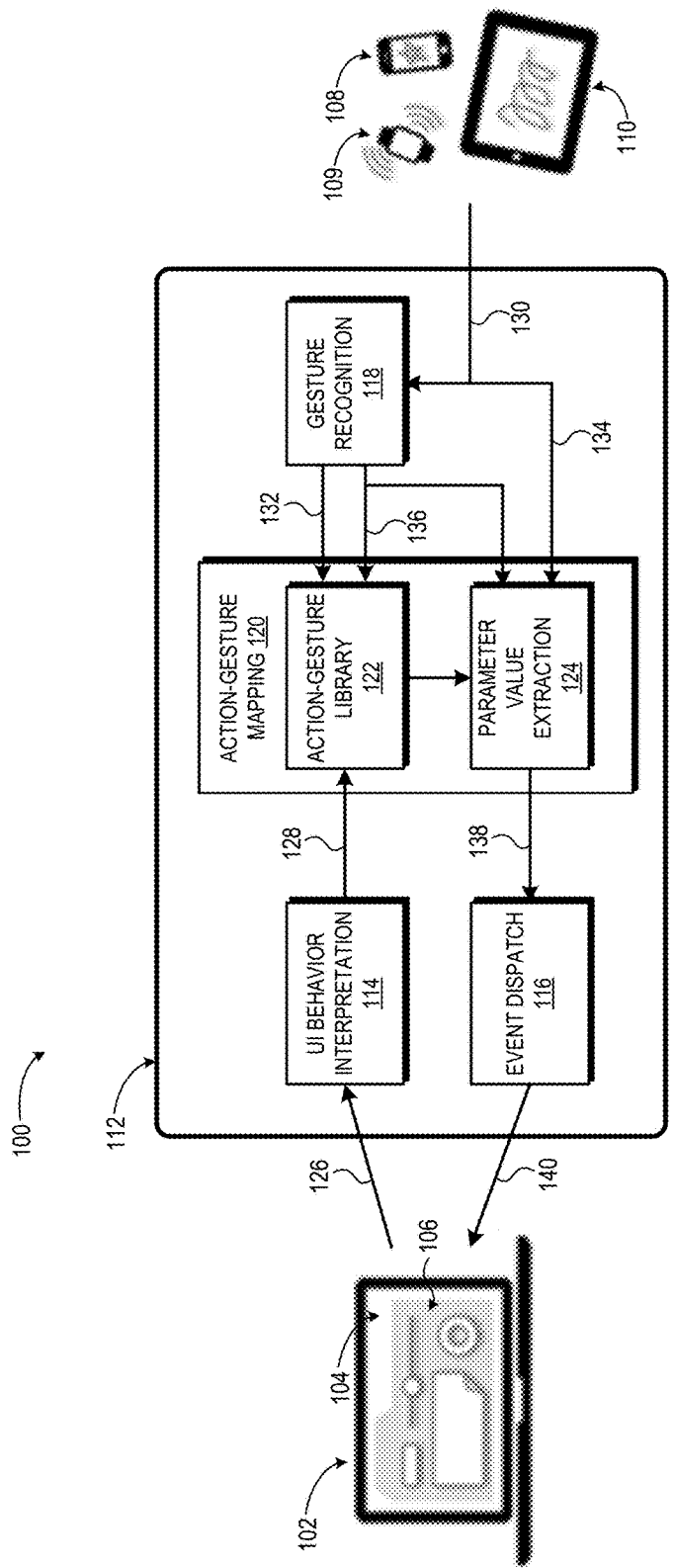
FIG. 1 is a diagram illustrating a system for cross-device interaction using user-demonstrated user interface (UI) actions at a primary device and user-demonstrated gestures at one or more accessory devices in accordance with some embodiments.

FIG. 1 illustrates a system 100 implementing a user-demonstration-based cross-device interaction process in accordance with at least one embodiment of the present disclosure. The system 100 includes multiple electronic devices controlled by, or otherwise available for manipulation by, a user. One of these devices, referred to herein as the "primary device" 102, operates to execute an application 104 that provides a user interface (UI) 106 through which the user can interact with the application 104. For example, the UI 106 can include various virtual buttons, knobs, sliders, input fields, pull-down lists, or other user-manipulated UI components, and the user may manipulate these UI through one or more user input devices of the primary device 102, such as a keyboard, a mouse, a touchscreen, and the like. The user's manipulation of one or more of these UI components in order to direct the application 104 to perform or affect a particular action is referred to herein as a "UI even sequence" and the resulting action is referred to herein as a "UI action."

In some instances, the user may desire to use one or more other devices, referred to herein as "accessory devices," to serve as a proxy or interface for the user's interaction with the primary device 102. Note that the terms "primary" and "accessory" are used merely for purposes of differentiation of function within the cross-device interaction process, and are not intended to imply any intrinsic differences, such as particular relationship with regard to size, power, computing throughput, capabilities, etc. As an example, the primary device 102 may take the form of a notebook computer executing a slideshow application (one embodiment of the application 104), and as such may the notebook computer may need to maintained at a fixed location near the projector being used to display the corresponding slide show. However, the user, wanting to be free to move about while making the presentation associated with the slideshow, may desire to use a mobile or wearable accessory in possession of the user, such as a smartphone 108, a smartwatch 109, or a tablet computer 110, to control certain aspects of the slideshow application, such as moving forward a slide or moving backward a slide. As another example, the primary device 102 may comprise a desktop computer executing the application 104 having a UI element that is manipulable via a mouse of the primary device 102. However, the user may find the use of the mouse in this manner cumbersome and thus prefer to use the touchscreen of, for example, the smartphone 108 to control the UI component instead.

To enable this cross-device interaction, the system 100 implements a cross-device interface module 112 for the mapping of user-demonstrated UI actions at the UI 106 of the application 104 at the primary device 102 to user-demonstrated gestures using an accessory device, and the subsequently emulation the UI action at the application 104 in response to detection of the gesture at the accessory device during run-time. The cross-device interface module 112 may be implemented at the primary device 102, at one or more of the accessory devices 108-110, at a remote server application (not shown in FIG. 1), or the functionality of the cross-device interface module 112 may be distributed among separate modules of one or more of the primary device 102, the accessory devices 108-110, and a remote server.

The cross-device interface module 112 itself comprises a plurality of modules, including a UI behavior interpretation module 114, an event dispatch module 116, a gesture recognition module 118, and an action-gesture mapping module 120. The action-gesture mapping module 120 further includes an action-gesture library 122 and a parameter value extraction module 124. These modules may be implemented as one or more processors executing one or more sets of instructions that manipulate the one or more processors and related circuitry to perform the actions described herein, implemented as an application specific integrated circuit (ASIC), programmable logic, or other hard-coded hardware component that perform the actions described herein, or a combination thereof.

As a general overview, a UI action-gesture mapping process is initiated when the user signals that the user is going to demonstrate a UI action via the UI 106 of the application 104. As described below, this signal may be provided via a graphical UI (GUI) associated with the cross-device interface module 112. As the user demonstrates the UI action by manipulating one or more UI components of the UI 106 in a specified manner and a specified sequence, the UI behavior interpretation module 114 observes the user's demonstration of the UI action through a capture of the stream of UI input events (hereinafter, the "demonstrated UI input events 126") triggered by the user's manipulation of one or more user input devices of the primary device 102 in relation to the UI elements of the UI 106. For example, to demonstrate the dragging of a horizontal slider bar component of the UI 106 via a mouse, these demonstrated UI input events 126 can include, for example, a UI input event generated when the user engages a button of the mouse, one more UI input events representing the movement of the mouse in a horizontal direction while the button is engaged, and then a UI input event when the user disengaged the mouse button with the mouse horizontally displaced.

When the user signals an end of the UI action demonstration, the UI behavior interpretation module 114 analyzes the sequence of demonstrated UI input events 126 generated from the UI action demonstration, determines a type of UI action based on, for example, the number of parameters or variables intrinsic to the UI action (this number of parameters being referenced herein as the "degree of freedom" or "DOF" of the UI action), and then generates a UI action model 128 based on the action type and the parameterization of the sequence of demonstrated UI input events 126. A representation of the UI action model 128 is then provided to the action-gesture mapping module 120, whereupon the action-gesture library 122 creates an entry to store the UI action model 128 for subsequence reference and use.

For the associated gesture, the user signals the initiation of a demonstration of a gesture the user intends to trigger the demonstrated UI action and then manipulates an accessory device to demonstrate the intended gesture. During this gesture demonstration operation, raw sensor data 130 from one or more gesture-related sensors of the accessory device is provided to the gesture recognition module 118. Such gesture-related sensors can include, for example, sensors that monitor the position or orientation of the accessory device itself, such as a gyroscope, an accelerometer, or a magnetometer, sensors that monitor the position of the user's body relative to the device, such as a touchscreen, infrared sensor, or combinations thereof. The gesture recognition module 118 operates to analyze the raw sensor data 130 and from this analysis identify an intended gesture 132 and its properties or parameters. The gesture recognition module 118 provides a representation of the intended gesture 132 and its parameters to the action-gesture mapping module 120.

The action-gesture mapping module 120 then operates to map certain properties or parameters of the intended gesture 132 to the parameters, or variables, of the corresponding UI action model 128 and configure the corresponding entry of the action-gesture library 122 accordingly. To illustrate using the horizontal slider bar example above, a parameter of the UI action model developed for the user's demonstrated action of dragging the slider bar may be a parameter variable representative of the degree to which the slider bar is moved horizontally during emulation of the slider bar manipulation action. If, for example, the user then demonstrates a gesture based on the user sliding a finger horizontally across a touchscreen of the accessory device, then the parameter of the gesture relevant to the parameter variable of the UI action model 128 may be identified the degree of horizontal movement of the user's finger during the touch event, and thus the action-gesture mapping module 120 maps the horizontal-slider-movement parameter of the UI action model to the horizontal-finger-movement parameter of the horizontal swipe gesture. As such, at a result of this user-directed training, the action-gesture library 122 stores an entry having one or more data structures representing the UI action model 128, the corresponding gesture 132, and the mapping of parameters between the two.

With the cross-device interface module 112 so configured, any subsequent instance of the demonstrated gesture 132 at the accessory device will trigger the cross-device interface module 112 to emulate an instance of the corresponding UI action. To this end, sensor data 134 from the gesture-related sensors of the accessory device is streamed to the gesture recognition module 118, which monitors the sensor data 134 for evidence that the user has manipulated the accessory device to perform one of the active gestures in the action-gesture library 122. In the event that such a gesture is detected, the gesture recognition module 118 signals the detected gesture 136 to the action-gesture mapping module 120, which in turn triggers the action-gesture library 122 to provide information regarding the variables of the UI action model 128 mapped to the detected gesture 136 to the parameter value extraction module 124. In one embodiment, the parameter value extraction module 124 receives the sensor data 134 in parallel with the gesture recognition module 118, and in response to the detected gesture 136 the parameter value extraction module 124 analyzes the sensor data 134 to identify the value of each of the zero or more parameters of the detected gesture 136 (referred to herein as "parameter values 138"). Using the example of the sliding touch gesture described above, the length of the sliding touch gesture may be extracted from the sensor data 134 and assigned as the value for a "slide length" parameter of the gesture, which in turn is mapped to a "slide length" parameter of the UI action model 128 for the horizontal slider bar, and thus its value controls the extent or magnitude by which the position of the horizontal slider bar is changed during emulation.

The event dispatch module 116 receives a representation of the UI action model 128 associated with the detected gesture 136 from the action-gesture library 122, as well as a representation of the zero or more parameter values 138 extracted by the parameter value extraction module 124. From these, the event dispatch module 116 maps the parameter values 138 to the corresponding parameters of the UI action model 128 based on the mapping identified by the action-gesture mapping module 120, and from the resulting value-mapped UI action model 128 the event dispatch module 116 performs an emulation 140 of an instance of the UI action via the UI 106 of the application 104 at the primary device 102. As described in greater detail below, this UI action emulation 140 can include, for example, injecting or otherwise emulating a sequence of UI input events representing the UI action such that it appears to the application 104 that the user is manipulating a user input device in the corresponding manner. These UI input events may be injected at the operating system (OS) level such that the injected UI input events are treated exactly the same as though they were native UI input events generated by the user input devices of the primary device 102. That is, the emulated UI input events appear to the OS and all applications running at the primary device 102 as though a user input device were being physically manipulated by the user. Alternatively, the UI input events may be dispatched at the application level, such that the emulated UI input events appear to be actual UI input events only to the application 104, and thus do not affect the OS or other applications.

Some UI actions, such as the selection of a button, have zero parameters (DOF=0); that is, they are binary or discrete UI actions. In such instances, detection of the corresponding gesture at the accessory device triggers the cross-device interface module 112 to emulate the one or more UI input events that represent such UI actions without variation. However, other UI actions, such as the manipulation of a slider bar, have one parameter (DOF=1) (e.g., the degree to which the slider is slid) or two parameters (DOF=2)(e.g., the freeform movement of a virtual laser pointer in a slideshow application). In such instances, the parameter values extracted from the detected gesture 136 reflect the magnitude or other value of the mapped parameter in the UI action model 128. For example, the amount of horizontal movement in a sliding finger touch on the touchscreen of an accessory device serves to control the magnitude of horizontal movement of the mouse when the corresponding cursor is engaged with the slider property of a horizontal slider bar component. Accordingly, the parameter values for the detected gesture 132 are used to modify or otherwise control the emulated UI input event sequence dispatched by the event dispatch module 116.

Figure 2:
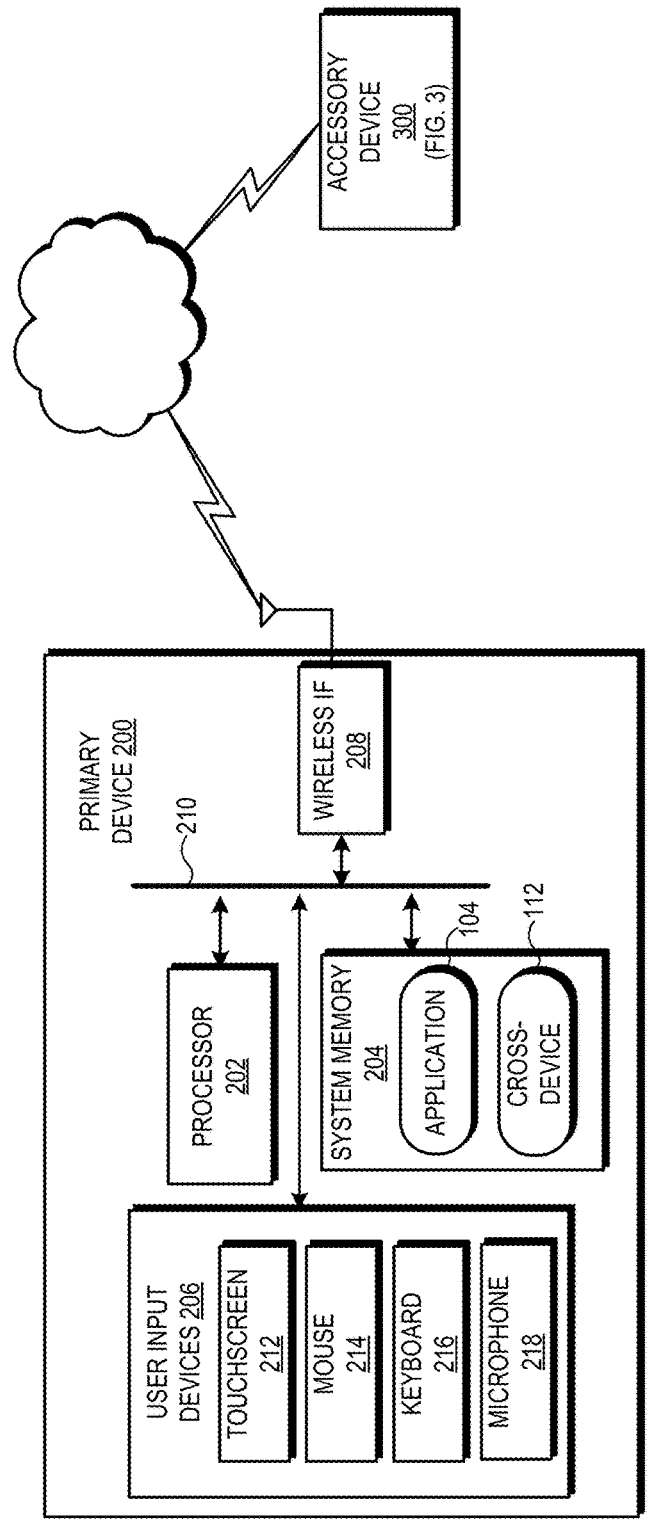
FIG. 2 is a block diagram illustrating an example hardware implementation of a primary device in accordance with at least one embodiment of the present disclosure.

FIG. 2 illustrates an example implementation of a primary device 200 in accordance with at least one embodiment of the present disclosure. The primary device 200 (corresponding to the primary device 102 of FIG. 1) can include any of a variety of electronic devices configured to execute one or more applications, such as a desktop computer, a notebook computer, a tablet computer, a smartphone, a smartwatch or other wearable device, a gaming console, a network appliance, and the like. As depicted, the primary device 200 includes one or more processors 202, one or more storage components, such as system memory 204 or a storage drive (not shown), a set 206 of user input devices, and a network interface 208 interconnected via one or more busses 210 or other component interconnects. The set 206 of user input devices includes one or more user input devices that may be manipulated by a user to perform a UI action, such as a touchscreen 212, a mouse 214, a keyboard 216, a microphone 218, an infrared sensor, and the like. The network interface 208 operates to connect the primary device 200 to one or more accessory devices 300 (illustrated in greater detail in FIG. 3). In at least one embodiment, the primary device 200 is coupled to an accessory device 300 via a direct wireless connection, such as a Bluetooth™ connection, a near field communications (NFC) connection, or an Institute of Electrical and Electronic Engineers (IEEE) 802.11 connection, or an indirect wireless connection, such as via a multi-hop IEEE 802.11 connection or via an Internet connection. Accordingly, the network interface 208 is also referred to herein as "wireless interface 208"). In other embodiments, the primary device 200 and the accessory device 300 may be coupled via a cable or other wired connection, such as via a universal serial bus (USB) connection, in which case the network interface 208 would be the appropriate interface for the cable.

In the depicted example of FIG. 2, the cross-device interface module 112 is implemented as a software module having a set of executable instructions stored in the system memory 204 or other storage component of the primary device 200 and having the one or more processors 202 executing the set of executable instructions such that the executable instructions manipulate the one or more processors 202 and associated components of the primary device 200 to perform the actions described herein. Likewise, the application 104 is also implemented as a set of executable instructions stored in the system memory 204 or other storage component and executed by the one or more processors 202. As described in greater detail herein, in some embodiments, the application 104 may comprise a web browser application, and the cross-device interface module 112 may be implemented as a browser extension, or "plugin," that interfaces with the web browser application.

Figure 3:
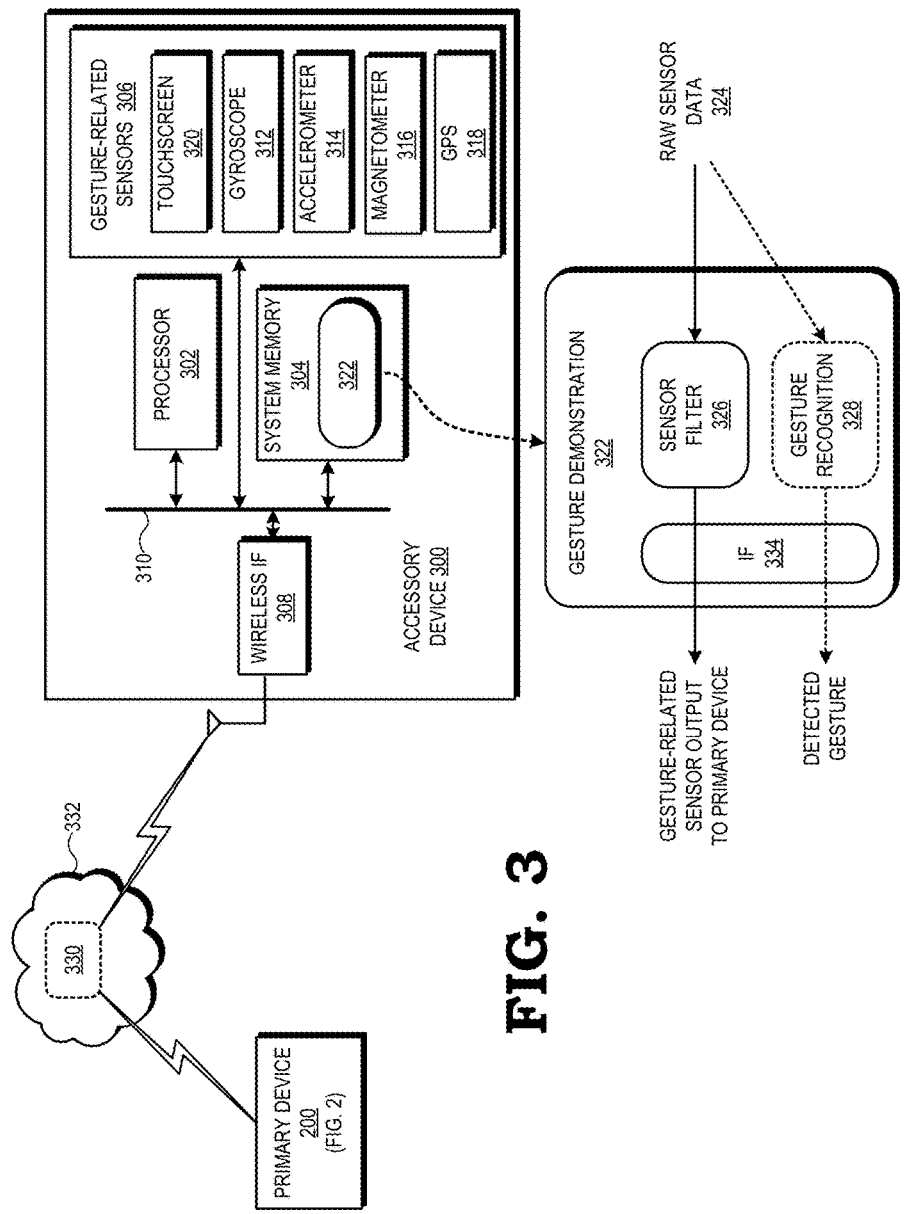
FIG. 3 is a block diagram illustrating an example hardware implementation of an accessory device in accordance with at least one embodiment of the present disclosure.

FIG. 3 illustrates an example implementation of the accessory device 300 in accordance with at least one embodiment of the present disclosure. The accessory device 300 (corresponding to, for example, the accessory devices 108-110 of FIG. 1) can include any of a variety of electronic devices, such as the example devices identified above with respect to the primary device 102. As depicted, the accessory device 300 includes one or more processors 302, one or more storage components, such as system memory 304 or a storage drive (not shown), a set 306 of gesture-related sensors, and a network interface 308 interconnected via one or more busses 310 or other component interconnects. The set 306 of gesture-related sensors includes sensors that may be used to sense a user's manipulation of the accessory device 300 in the performance of a gesture. Such sensors can include sensors to detect movement, pose, or orientation of the accessory device 300, such as a gyroscope 312, an accelerometer 314, a magnetometer 316, a global positioning system (GPS) sensor 318, and the like. These sensors also may include sensors that are used to detect user gestures in the form of contact, or change in contact, with the accessory device 300, such as via a touchscreen 320, trackpad (not shown), and the like.

As described herein, the user signals a gesture to a primary device through motion-based or touch-based manipulation of the accessory device 300. As such, the accessory device 300 implements a gesture demonstration module 322 to provide this signaling to the primary device. As depicted, the gesture demonstration module 322 may be implemented as a software module stored in the system memory 304 or other storage component and executed by the one or more processors 302. For example, the gesture demonstration module 322 may be implemented as a thread or other module of an application installed and executed on the accessory device 300. In other embodiments, the gesture demonstration module 322 may be implemented in whole or in part as an ASIC, programmable logic, or other hard-coded hardware.

In one embodiment, the raw sensor data from the set 306 of gesture-related sensors is provided to the cross-device interface module 112, and the gesture recognition module 118 (FIG. 1) analyzes the raw sensor data to detect a gesture and any associated gesture parameters. In this configuration, the gesture demonstration module 322 operates to forward the raw sensor data 324 from the set 306 to the primary device. As part of this forwarding process, the gesture demonstration module 322 may employ a sensor filter module 326 to pre-filter the raw sensor data. To illustrate, the sensor filter module 326 may filter out sensor data that is determined to be noise or otherwise not representative of an intended gesture by the user. For example, if the accessory device 300 is a smartwatch and the user is demonstrating a rotation of the smart watch through rotation of the wrist of the user, the user may introduce some unintended horizontal or vertical translation of the smartwatch while turning the wrist. This translation may be on the order of millimeters or less, and may be a relatively small change compared to the degree of rotation experienced by the smartwatch during the demonstrated gesture. As such, the sensor filter module 326 may operate to eliminate the sensor data representing this translation from the sensor data output to the primary device. The pre-filtering provided by the sensor filter module 326 may be based on a specified absolute threshold for each sensor type, a relative threshold (that is comparing the magnitude of one sensor data to the magnitude of another) or a combination thereof.

In other embodiments, rather than detecting and analyzing gestures at the primary device, the gesture detection and analysis process is implemented instead at the accessory device 300. In such instances, the gesture demonstration module 322 includes a gesture recognition module 328, which is analogous to the gesture recognition module 118, and which operates to monitor the raw sensor data 324 during a gesture demonstration to identify the corresponding gesture and its parameters, and to monitor the raw sensor data 324 during non-demonstration execution to detect the performance of an instance of the gesture by the user, and extract any particular values for the corresponding salient properties. The gesture demonstration module 322 then signals the detected gesture and its parameters to the cross-device interface module 112 as similarly described above.

In some embodiments, the communication of information from the gesture demonstration module 322 at the accessory device 300 to the cross-device interface module 112 at the primary device is performed via a server application 330 serving as a proxy or intermediary between the two modules. The server application 330 may be a server application executed by the primary device; that is, the server application 330 may be local to the primary device. In other embodiments, the server application 330 may be implemented as a remote server to both the accessory device 300 and the primary device. For example, the server application 330 may be implemented as a server application executed by a remote server on the Internet or other wide area network 332 (that is, "in the cloud"). To illustrate with reference to the web browser/browser extension implementation example described herein, the server application 330 may be implemented as a hypertext transfer protocol (HTTP) server through which information from the gesture demonstration module 322 may be routed to the cross-device interface module 112 using port-based communications well-known in the art. As such, the gesture demonstration module 322 further may include a server interface 334 to interface with the server application 330 and route the sensor data information or detected gesture information accordingly.

Figure 4:
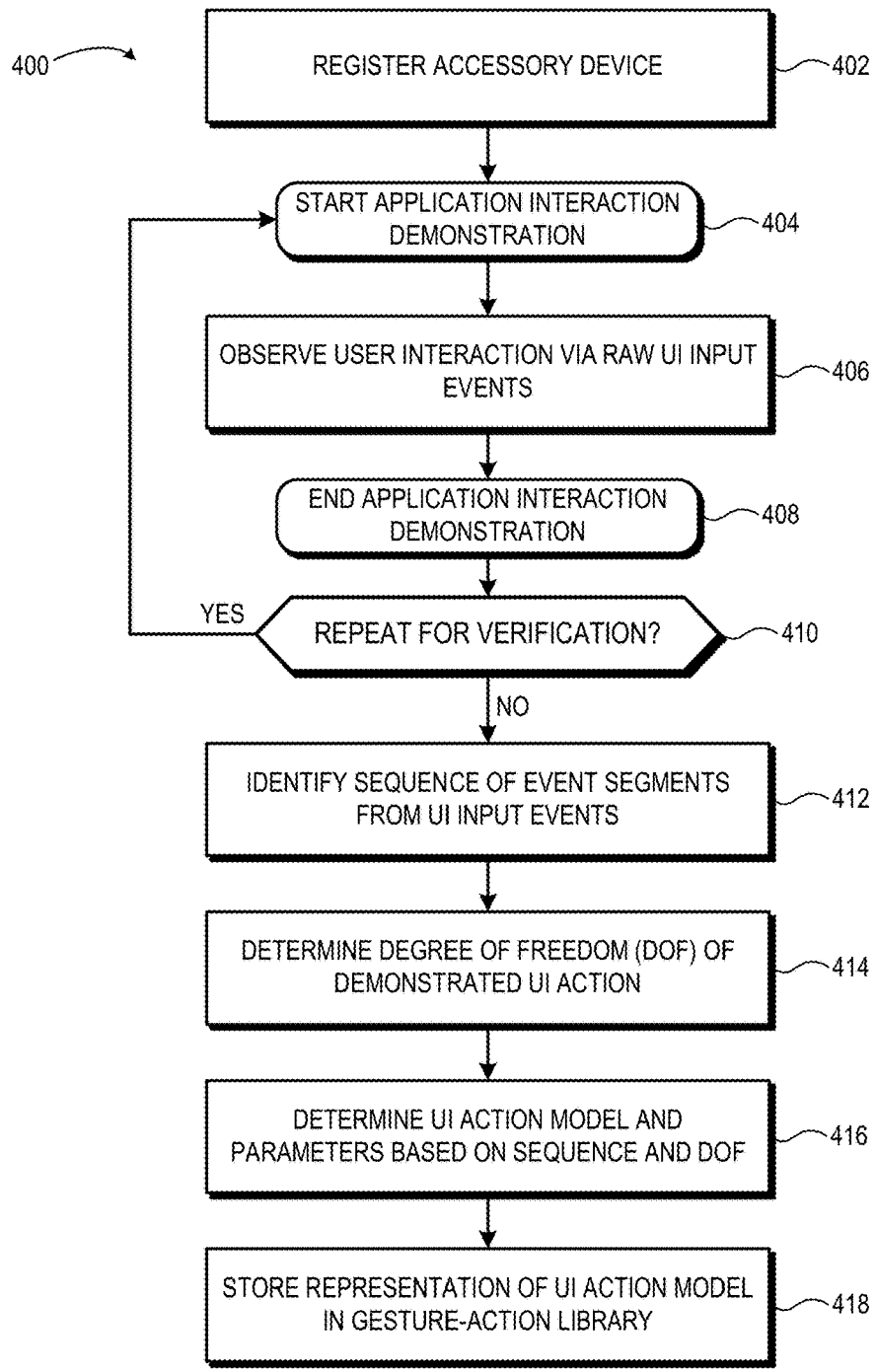
FIG. 4 is a flow diagram illustrating a method for observing a user demonstration of a UI action at an application of a primary device and generating a UI action model in accordance with at least one embodiment of the present disclosure.

FIG. 4 illustrates an example method 400 for user-defined configuration of a primary device and an accessory device to enable an instance of a gesture at the accessory device to trigger a corresponding UI action at the primary device in accordance with at least one embodiment. For ease of illustration, the method 400 is described in the example context of the cross-device interface module 112 of FIG. 1, the primary device 200 of FIG. 2, and the accessory device 300 of FIG. 3. In order to facilitate cross-device interaction, the primary device 200 and accessory device 300 should be made aware of each other. Accordingly, the method 400 may initiate at block 402 with the registration of the accessory device 300 with the cross-device interface module 112 at the primary device 200. This registration may be performed specifically for purposes of the cross-device interaction process; that is, upon initialization the gesture demonstration module 322 or other module of the accessory device 300 may actively seek to register with the cross-device interface module 112. In other embodiments, the accessory device 300 may register with the primary device 200 for more general purposes, such as via a standard Bluetooth™, USB, or Wi-Fi registration process, and the cross-device interface module 112 then may access the list of accessory devices so registered to identify accessory devices potentially capable of supporting cross-device interactions.

With the accessory device 300 so registered and identified, at block 404 the user initiates an application interaction demonstration operation so as to demonstrate a desired UI action to be performed at run time via the UI 106 of the application 104. As described in more detail below, in some embodiments, the cross-device interface module 112 may provide a GUI through which the user may signal the initiation of this demonstration, such as through the selection of a "record" button or other appropriate UI element in the GUI. With the start of the demonstration so signaled, at block 406 the user demonstrates the intended UI action by interacting with the UI 106 using one or more user input devices of the primary device 200 in a manner and sequence representative of the UI action and the UI behavior interpretation module 114 observes the demonstrated UI action. In some embodiments, this observation takes the form of the UI behavior interpretation module 114 capturing the sequence of UI input events triggered by the user during the demonstrated UI action. These UI input events represent the raw user inputs dispatched by the processing system of the primary device 200 to the UI elements of the UI 106.

For example, for a user input device in the form of a mouse, the user engaging a button on the mouse triggers a UI input event that is dispatched to the UI element associated with the current position of the cursor associated with the mouse. Similarly, while the user moves the mouse with the button so engaged, the updated X,Y position of the cursor may be dispatched as a UI input event to a corresponding UI element. Further, when the user releases the button on the mouse, this also may be dispatched as a UI input event to a correlated UI element. As another example, a user's contact with a touch screen triggers an engage UI input event, which may be is dispatched to a UI element correlated with the X,Y position of this contact. Then, as the user moves a finger across the touchscreen, the updated X,Y position of the current point of contact may be dispatched as an UI input event to a correlated UI element. Further, when the user removes the finger from the touchscreen, the removal of contact may be dispatched as a disengage UI input event to a corresponding UI element in the UI 106. A user's manipulation of one or more keys of a keyboard likewise may be observed as a sequence of such dispatched UI input events. Although observation of the demonstrated UI action through dispatched UI input events typically only provides a partial understanding of the UI 106, this approach is not tied to an underlying understanding of the UI 106 and its function calls, and thus permits a range of UIs to be analyzed and operated in a consistent way.

When the user has completed demonstration of the intended UI action, at block 408 the user signals an end to the demonstration, such as by actively selecting a UI element of the GUI of the cross-device interface module 112 provided for this purpose, or through the passive expiration of a time-out timer when no further UI event activity is detected after a specified period of time. In some instances, the user's demonstration of the UI action may be deficient in some way. For example, the user may have not carefully controlled the motion of the mouse, or there may be an insufficient number of UI events from which an intended UI action may be ascertained. Further, the demonstrated UI action may be sufficiently complicated or have a relatively large amount of possible variation. In such instances, it may be advantageous to have the user repeat the UI action demonstration one or more times, and thus at block 410 the UI behavior interpretation module 114 determines whether the UI action demonstration should be repeated by the user. If so, the process of blocks 404-410 may be repeated one or more times until the UI behavior interpretation module 114 has obtained sufficient observation information.

After the final iteration of the demonstration is completed, the cross-device interface module 112 begins the process of interpreting the stream of observed UI input events to determine a UI action model for the demonstrated action. As part of this process, at block 412 the UI behavior interpretation module 114 parses the stream of UI input events into a sequence of one or more event segments, with each event segment representing a unique event in the user-demonstrated application interaction. For UI input events involving user input devices such as mice, keyboards, or touchscreens, this parsing process may segment the UI event inputs such that each segment starts with an engage event (engagement of a mouse button, pressing down on a key, or initial contact with a touchscreen) and ends with a disengage event (disengagement of the mouse button, release of the key, or removal of contact with the touchscreen. For mouse or touchscreen-based events, the user may input movement of the mouse or movement of the place of contact between the engage event and the disengage event, and the segment thus would also include a series of movement events involving the X,Y coordinates from the cursor or touchscreen point of contact.

With a sequence of one or more event segments identified for the demonstrated application interaction, the UI behavior interpretation module 114 initiates the process of modeling this demonstrated UI action. In one embodiment, the modeling process involves the UI behavior interpretation module 114 determining at block 414 the type of UI action demonstrated by the user. This "type" may refer to the number of intrinsic continuous variables that govern the state of the user demonstrated state of behavior, with this number of continuous variables being referred to herein as the "degree of freedom" or DOF of the demonstrated UI action.

When the demonstrated UI behavior is meant to cause a discrete, or binary, effect in the UI 106, such as a button click or selection of the ith element in a pulldown menu, this effect is triggered when the demonstrated UI action is completed and is not impacted with any state change during the performance of the demonstrated UI action. For example, minute shifts in the position of a cursor caused by slight tremors in the user's hand between the user engaging a mouse button and then disengaging the mouse button to click a corresponding button UI element in the UI 106 do not change the discrete nature of the button click. As such, a UI action that causes a discrete effect may be identified as a discrete-type UI action having zero degrees of freedom, or "0 DOF." For such UI behavior, the UI action may be emulated by simply replaying the same observed UI input events without needing to accommodate for any variables or other variation in the UI action.

Other demonstrated UI actions that are represented as a single event segment but with sufficient spatial movement are interpreted by the UI behavior interpretation module 114 as UI actions used by the user to apply a continuous transformation to a UI element. This continuous transformation may involve a single variable (that is, is linearly or rotationally constrained) and thus characterized as a translation/rotation continuous type of UI action having one degree of freedom (1 DOF). For example, a horizontal slider element may only be shifted in the X direction, and thus the degree of shift in the X direction is the single variable governing the UI action. As another example, while a rotational knob may be manipulated through changes in both the X and Y directions, the X and Y directions are correlated and this correlation is governed by a single variable—that is, the orientation angle of the rotational knob. This continuous transformation represented by the user-demonstrated UI action instead may involve two variables (e.g., the freeform dragging of an UI object within a canvas area of the UI 106).

To determining whether a continuous-type UI action has 1 DOF or 2 DOF (or more than 2 DOF), the UI behavior interpretation module 114 may evaluate whether the UI action exhibits either a linear correlation or rotational correlation between it its horizontal, or X, components and its vertical, or Y, components, both of which are frequently represented in common GUI element behaviors. Equation 1 below models linearly-correlated behavior, whereby the UI behavior interpretation module 114 determines the two-dimensional (2D) vectors d and b from the parsed sequence of event segments and m is the single variable that determines x and y at time t:

$$\begin{bmatrix} x_t \\ y_t \end{bmatrix} = m_t \begin{bmatrix} a_1 \\ a_2 \end{bmatrix} + \begin{bmatrix} b_1 \\ b_2 \end{bmatrix} \quad \text{EQ. 1}$$

Equation 2 below models rotationally-correlated behavior, whereby the UI behavior interpretation module 114 determines the constant radius r and the 2D vector $\vec{c}$ from the parsed sequence of event segments and a is the single variable underlying the rotation:

$$\begin{bmatrix} x_t \\ y_t \end{bmatrix} = r \begin{bmatrix} \cos\alpha_t \\ \sin\alpha_t \end{bmatrix} + \begin{bmatrix} c_1 \\ c_2 \end{bmatrix} \quad \text{EQ. 2}$$

Thus, to determine whether the demonstrated UI behavior represents one intrinsic variable (1 DOF) or 2 intrinsic variables (2 DOF), the UI behavior interpretation module 114 may use least-squares fitting or another evaluation approach to determine whether the changes in the X and Y coordinates during the demonstrated UI behavior are linearly or rotationally correlated in accordance with Equations 1 and 2, respectively. If so, the demonstrated UI action may be considered to have 1 DOF, and processed accordingly. Moreover, the mapping function (that is, the appropriate one of Equations 1 or 2) for the UI action further is identified from this fitting process. However, if the fitting error is larger than a specified threshold, then the UI behavior interpretation module 114 identifies the demonstrated UI action as having at least 2 DOF.

With the nature of the UI action characterized, the cross-device interface module 112 determines how a user-demonstrated gesture intended to trigger the UI action is to be processed to fulfill the behavior represented by the UI action. Accordingly, at block 416 the UI behavior interpretation module 114 determines a UI action model as a parameterized function or other representation of the demonstrated UI action based on the sequence of event segments identified at block 412 and the DOF type determined at block 414. That is, based on the DOF of the UI action, the UI behavior interpretation module 114 determines the number of properties or other parameters that will need to be extracted from the corresponding demonstrated gesture in order to configure or otherwise manipulate the variables of the UI action.

When the UI action is identified as having 0 DOF, there are no variables to define the behavior of an instance of the UI action when triggered, and thus in such instances the UI behavior interpretation module 114 will not need to extract any variable properties of the user-demonstrated gesture. That is, the entire gesture is treated monolithically or as a whole, and thus when the gesture is finished (e.g., the user completes the drawing of a symbolic-type gesture), the UI action will be replayed without variation. In such instances, the UI action model simply represents the same sequence of event segments observed during the UI action demonstration. That is, the UI action model is simply a replay of the exact same raw UI even inputs from the demonstrated UI behavior.

When the UI action is identified as having 1 DOF, the UI behavior interpretation module 114 develops the UI action model as a parametric function having one variable parameter. To illustrate, if the user-demonstrated UI action is the sliding of a horizontal slider to the right, then the UI action may be parameterized as a sequence of event segments having UI input events represented as: <UI input event=engage mouse button at position (X1, Y1)><UI input event=move cursor to (ΔXt, Y1)><UI input event=disengage mouse button>, ΔXt represents the change in the X position of the cursor from its previous position at time t−1 and is parametrized as ΔXt=m*Δxt, where Δxt represents a corresponding change in the corresponding property of the user-demonstrated gesture from its previous state at time t−1, and m is a constant scaling factor. Thus, in this instance, the UI action model includes the single parameter Δxt to which a corresponding parameter or other property of the user-defined gesture will be mapped.

When the UI action is identified as having 2 DOF, the UI behavior interpretation module 114 develops the UI action model as a parametric function having two variable parameters to be mapped to corresponding parameters of a user-demonstrated gesture. As one example, the UI action model may comprise a parameterized function representing the freeform movement of a simulated laser pointer cursor in a display window of the application 104, and thus in this case the UI action model would include a first parameter representing the current X position of the cursor and a second parameter representing the current Y position, with these first and second parameters then to be mapped to two parameters or properties extracted from the user-defined gesture.

With a parametrized UI action model identified, at block 418 the UI behavior interpretation module 114 provides a representation of the UI action model and its parameters to the action-gesture mapping module 120, which then stores a representation of the UI action model in a corresponding entry of the action-gesture library 122. This entry may include, for example, an action identifier (ID), a representation of the parameterized function representing the UI action, or a template of UI input events with modifiable variables, and the like. Further, as discussed below, after a user-demonstrated gesture for the UI action has been processed, the entry further may include representations of a function or other process for mapping one or more parameters of the user-defined gesture to the corresponding parameters of the UI action model.

Figure 5:
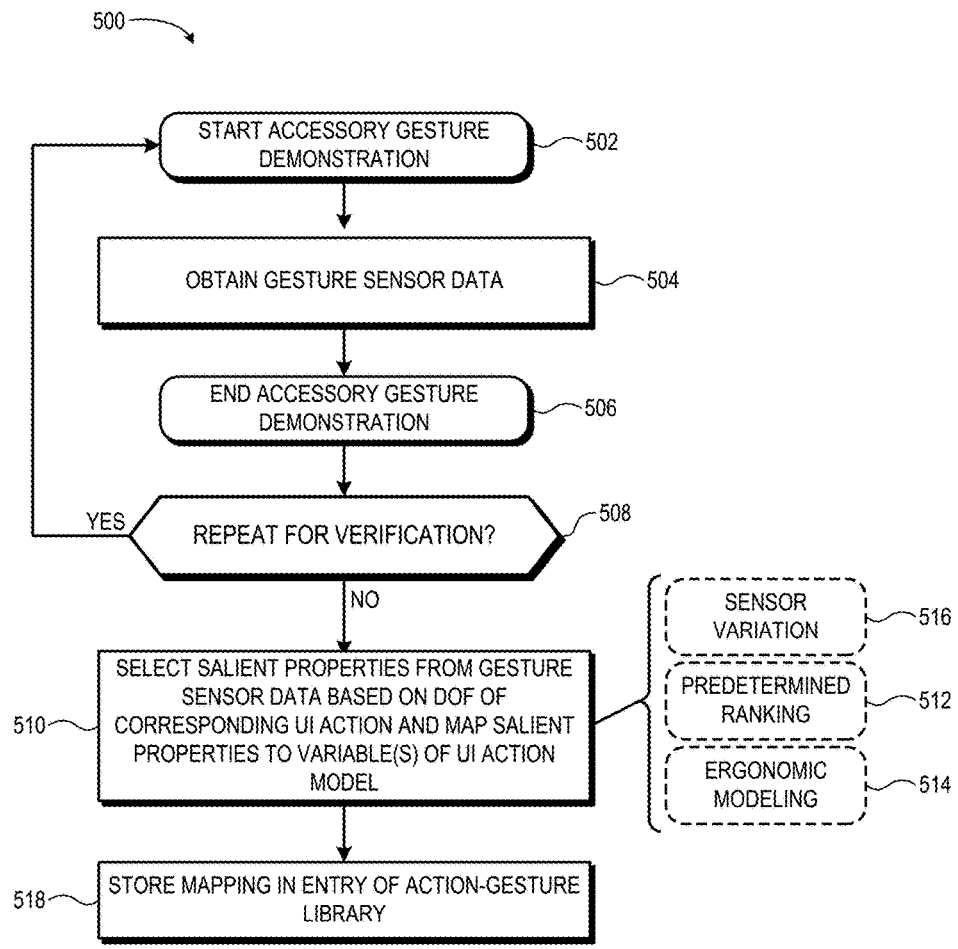
FIG. 5 is a flow diagram illustrating a method for observing a user demonstration of a gesture at an accessory device and extracting the salient properties from the gesture for the corresponding UI action in accordance with at least one embodiment of the present disclosure.

FIG. 5 illustrates an example method 500 for triggering the UI action at the primary device in response to detection of an instance of the gesture at the accessory device. For ease of illustration, the method 500 is described in the example context of the cross-device interface module 112 of FIG. 1, the primary device 200 of FIG. 2, and the accessory device 300 of FIG. 3. With a UI action demonstrated by a user and analyzed and modeled by the UI behavior interpretation module 114, the user then may demonstrate a gesture at the accessory device 300 that the user intends to trigger performance of an instance of the UI action for the application 104 of the primary device 200. Accordingly, the method 500 initiates at block 502 with the user signaling through a GUI of the cross-device interface module 112 or other mechanism that the user will be demonstrating a gesture at the accessory device 300. This signaling initiates a gesture demonstration operation by the gesture demonstration module 322 of the accessory device 300. Accordingly, at block 504 the gesture demonstration module 322 obtains a stream of sensor data output by the set 306 of gesture-related sensors of the accessory device 300 as the user touches, moves, or otherwise manipulates the accessory device 300 so as to demonstrate the gesture. At block 506, an end of the demonstration operation is signaled, either through the user signaling the end via a button or other selectable UI element, or via a time-out due to a predetermined amount of time passing since the last user manipulation was detected.

In some instances the demonstration of the gesture may not have generated sufficient sensor data from which a gesture may be extracted, or it may be advantageous to repeat the gesture demonstration multiple times to verify the correct gesture has been identified. Accordingly, at block 508 the gesture recognition module 118 determines whether to repeat the gesture demonstration, and if another iteration is warranted, the cross-device interface module 112 prompts the user to repeat the gesture.

If no further iterations of the demonstrated gesture are warranted, the sensor data from each of the one or more demonstration iterations is forwarded to the gesture recognition module 118. As noted above, in some instances the gesture demonstration module 322 may employ a sensor filter module 326 to prefilter the sensor data, such as by removing sensor data that is recognizably noise or otherwise known to be inapplicable as a gesture, to smooth certain sensor data, and the like. Alternatively, as also noted above, the gesture recognition process may be performed by the gesture recognition module 328 at the accessory device 300 rather than at the gesture recognition module 118. In such instances, reference herein to the operations of the gesture recognition module 118 also applies to the gesture recognition module 328.

At block 510, the gesture recognition module 118 analyzes the gesture-related sensor data to identify a gesture from the motion, touch, or other user manipulation of the accessory device 300 represented in this sensor data. In particular, the gesture recognition module 118 performs this analysis in view of the DOF of the UI action model associated with the demonstrated gesture. That is, the gesture recognition module 118 "recognizes" a gesture from the sensor data based in part on how many variables are present in the corresponding UI action. Accordingly, with the DOF of the UI action identifying the number of parameters that need to be mapped to the user-demonstrated gesture, at block 510 the gesture recognition module 118 selects a salient property of the sensor data for each of the parameters. The particular property of the sensor data selected for a corresponding parameter may be based on any of a variety of factors or considerations.

For example, if the UI action has 0 DOF, the gesture recognition module 118 may select the sensor data from a particular gesture-related sensor as representing the gesture based on, for example, a predetermined ranking 512 of the gesture-related sensors. For example, sensor data from the touchscreen 320 may be preferentially selected over sensor data from the gyroscope 312, and so forth. Thus, if there is substantial sensor data from the touchscreen 320 during gesture demonstration for a UI action having 0 DOF, the gesture recognition module 118 may identify the user as intending to demonstrate a symbolic gesture through a specific pattern of touch on the touchscreen 320. However, in the absence of touchscreen sensor input, the gesture recognition module 118 instead may look to the sensor data of the gyroscope 312 in this example for a representation of the user's intended gesture, and so forth.

The salient property extracted by the gesture recognition module 118 for a corresponding parameter of the UI action also may be based on an ergonomic model 514 that specifies which types of sensors are more likely to be associated by users with particular UI actions. For example, the UI action may represent a rotational manipulation of a UI knob element, and the ergonomic model 514 may inform the gesture recognition module 118 that users are most likely to use a change in the pose of the accessory device 300 or a rotational touch movement as the intended gesture for a rotational manipulation, and thus the gesture recognition module 118 may look to the sensor data of the gyroscope 312 or the touchscreen 320 for the salient property of the demonstrated gesture for the UI action.

The gesture recognition module 118 also may use a sensor variation factor 516 to identify the most salient property of the gesture to be mapped to a corresponding parameter of the UI action. That is, the gesture recognition module 118 may evaluate the output of each of gesture-based sensors and identify the sensor with the greatest variation, either relative or absolute, occurring during the gesture demonstration, and map this sensor data to the corresponding parameter. As noted above, the UI action may have two or more parameterized variables to be mapped to corresponding parameters of the demonstrated gesture. In this such cases, the gesture recognition module 118 may utilize any of a variety of mapping processes. For example, the two variables of the UI action may be ranked, and the gesture recognition module 118 may identify the sensor data with the greatest variability and assign this to the higher ranked variable and identify the sensor data with the second greatest variability and assign this to the lower ranked variable. The predetermined ranking 512 and the ergonomic model 514 likewise may be incorporated into this mapping between sensor data properties and corresponding variables of the UI action.

With the one or more salient properties or parameters of the demonstrated gesture mapped to the corresponding parameters of the UI action model, at block 518 the action-gesture mapping module 120 updates the entry of the action-gesture library 122 to reflect the mapping between gesture parameters and UI action parameters. With the action-gesture library 122 so updated, the cross-device interface module 112 is configured to trigger the emulation of an instance of the UI action at the primary device 200 in response to detecting an instance of the demonstrated gesture at the accessory device 300.

Figure 6:
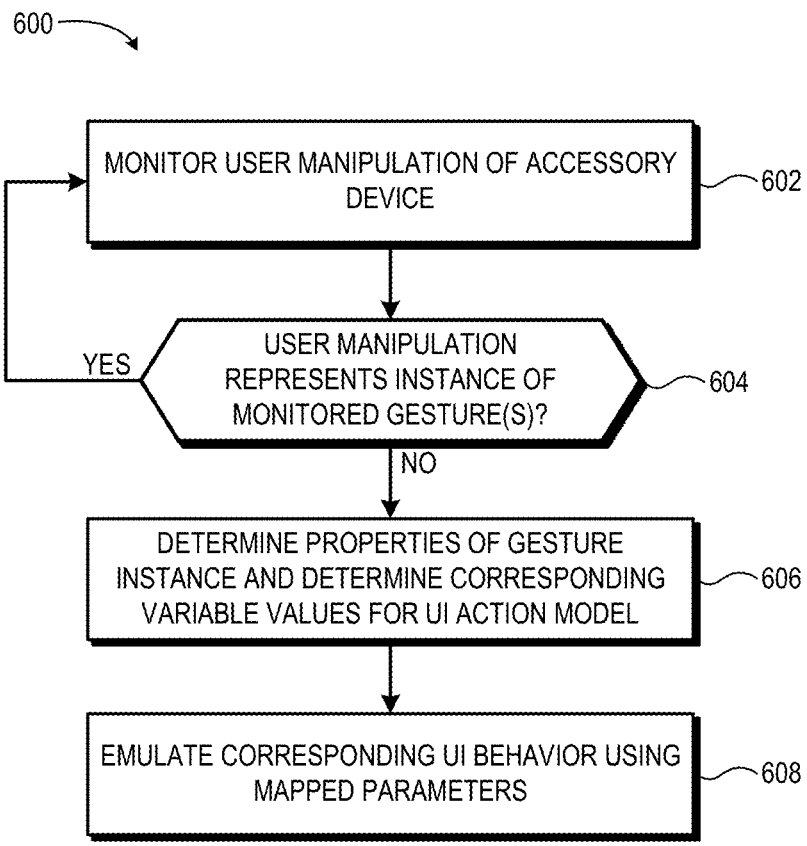
FIG. 6 is a flow diagram illustrating a method for triggering emulation of a UI action for an application executed at a primary device in response to a detected instance of a corresponding gesture at an accessory device in accordance with at least one embodiment of the present disclosure.

FIG. 6 illustrates an example method 600 for triggering this emulation of an instance of the UI action in accordance with at least one embodiment of the present disclosure. As the user's issuance of a gesture via the accessory device triggers the UI action emulation process, the method 600 initiates at block 602 with the gesture demonstration module 322 of the accessory device 300 streaming the sensor data output by the set 306 of gesture-based sensors to the cross-device interface module 112 and with the gesture recognition module 118 monitoring this stream of sensor data to analyze the user's manipulations of the accessory device 300 as represented by the data from these gesture-based sensors. In the event that the gesture recognition module 118 detects, at block 604, sensor data that corresponds to one of the gestures represented in the action-gesture library 122, the gesture recognition module 118 signals the detected gesture to the action-gesture mapping module 120. As part of this signaling, the gesture recognition module 118 may provide the sensor data representing the detected gesture to the parameter value extraction module 124.

In response to this signaling, at block 606 the parameter value extraction module 124 identifies the one or more salient properties in the provided sensor data that are mapped to the one or more variables of the corresponding UI action model using the information provided in the corresponding entry of the action-gesture library 122. The parameter value extraction module 124 then identifies the characteristics of the identified salient properties for this particular instance of the gesture and uses these characteristics to set corresponding values for the one or more parameters of the UI action model.

To illustrate, assume that the UI action model represents the sliding of a horizontal slider bar between a minimum position 1 and a maximum position 100, and the corresponding gesture is the rotation of the accessory device 300, and thus the sensor data of the gyroscope 312 is the salient property of the gesture that is mapped to the variable representing the change in position of the slider. Further, assume that the maximum change in rotation of the gyroscope 312 is set to 180 degrees for this gesture. As such, the mapping of the rotational parameter of the gyroscope to the corresponding change in position of the slider bar may be represented by the equation: $\Delta i = (100/180) * \Delta j$, where $\Delta i$ represents the change in the position of the slider and $\Delta j$ represents the change in the rotational position of the gyroscope 312 around a specified axis. As such, the parameter value extraction module 124 may identify the actual change in rotational position resulting from the detected instance of the gesture from the sensor data from the gyroscope 312, and from this determine the magnitude and direction of the change in position of the slider element when emulating a corresponding instance of the UI action associated with the gesture.

In instances where the UI action model has 0 DOF, then no parameter extraction is necessary, and thus detection of completion of the gesture (e.g., completion of the "drawing" of a corresponding symbol on the touchscreen 320) triggers the action-gesture mapping module 120 to bypass the parameter extraction process.

With the UI action model configured with particular values for its identified parameters (for UI action models having 1 or greater DOF), the cross-device interface module 112 is ready for emulation of the UI action. Accordingly, at block 608 the action-gesture mapping module 120 provides a representation of the UI action model) and an indication of the value(s) to be assigned to any variables of the UI action model to the event dispatch module 116, which then uses the supplied information to emulate an instance of the UI action through the dispatch of UI input events to the UI 106 in accordance with the UI action model and its configured variables. To illustrate, the representation of the UI action model can include a representation of a parametric function that represents the behavior to be performed via the UI 106, and the event dispatch module 116 may convert this parametric function to a sequence of UI input events, with the UI input events configured or modified in view of the specified values for the parameters of the function. Alternatively, the representation of the UI action model could include the sequence of UI input events already configured in view of the parameter values, in which case the event dispatch module 116 may operate to dispatch each UI input event in the specified sequence.

As noted above, while the application 104 may represent any of a variety of applications executable at an electronic device, because of their heavy reliance on graphical user interfaces and their standardized use of graphical UI elements, web browser applications (or "web applications") are particularly well suited examples of an application that may be utilized in the cross-device interaction process. In such instances, the cross-device interface module 112 may be advantageously implemented as, for example, a browser extension or "plugin" for the web browser application. In this configuration, the UI elements of the UI 106 may be identified from the graphical elements represented in, for example, a JavaScript GUI library (such as jQuery) representing UI elements in the web application as it is executed in the context of the web browser. These UI elements may be organized into one or more data structures by the web browser, such as the Document Object Model (DOM) tree provided by Google's Chrome™ web browser application. In such instances, the browser extension application implementing the cross-device interface module 112 may attach event listeners to each UI element in the DOM tree so as to record the UI input events via the event listeners during the UI action demonstration. At run time, when the UI action is to be emulated in response to detecting a corresponding gesture at the accessory device 300, the event dispatch module 116 may utilize, for example, JavaScript's dispatchEvent function to send simulated UI input events to the web browser application, which triggers the web browser application to behave as though the user were directly interacting with the web browser.

Figure 7:
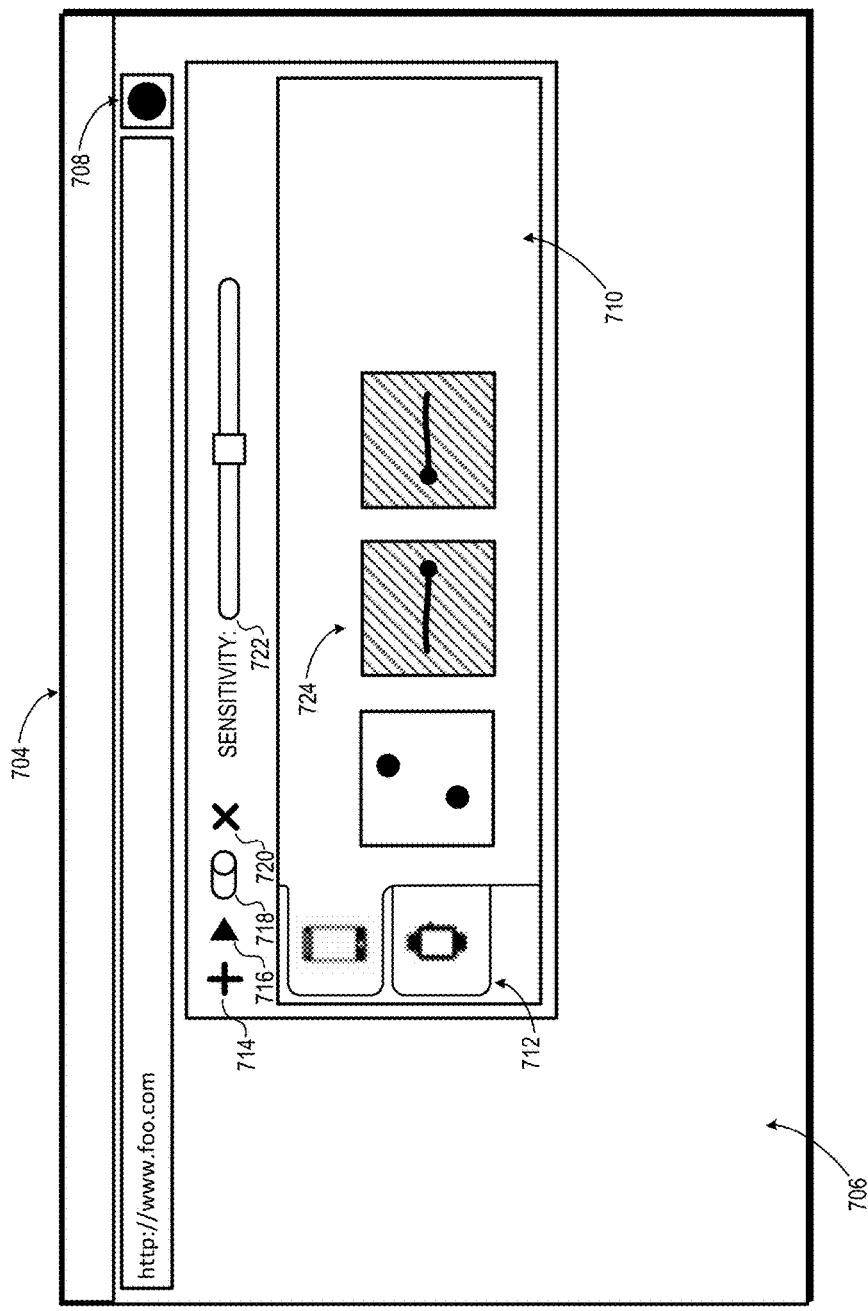
FIG. 7 is a diagram illustrating an example graphical user interface (GUI) of a cross-device interface module implemented as a browser extension for a web browser application in accordance with at least one embodiment of the present disclosure.

FIG. 7 illustrates an example of this implementation of the application 104 as a web browser application 704 and the cross-device interface module 112 as a corresponding browser extension in accordance with at least some embodiments. The web browser application 704 provides a GUI 706 in which the user may perform one or more UI actions through manipulation of UI elements using a mouse (via a cursor), a touchscreen, a keyboard, or other user input device. The browser extension representing the cross-device interface module 112 may be graphically represented in the web browser application 704 as a selectable icon element 708, the selection of which triggers the display of a GUI 710 for the cross-device interface module 112.

In the depicted example, the GUI 710 provides a number of UI elements that enable the user to configure various aspects of the cross-device interaction process. To illustrate, the GUI 710 may include a tab structure 712 or other UI structure to permit the user to select a particular accessory device that is registered with the cross-device interface module. In the illustrated example, the tab structure 712 has a tab for a smartphone and another tab for a smartwatch. Each accessory device further may have related configurable properties in the GUI 710, such as a selectable property 714 that the user may select to add an accessory device, a selectable property 716 that the user may select to initiate the process of demonstrating a UI action in the GUI 706 of the web browser application 704 and the corresponding gesture at the selected accessory device, a selectable property 718 that may be used to turn off or turn on a corresponding UI action/gesture pair, a selectable property 720 used to delete a selected UI action/gesture pair, and a variable selectable property 722 used to change the sensitivity (e.g., the proportionality between sensor variability and corresponding action variability) of a selected UI action/gesture pair. Each accessory device may have in the GUI 710 a window displaying the UI action/gesture pairs already recorded by the cross-device interface module 112, such as in the form of graphical icons depicting a representation of the gesture associated with the UI action.

Figure 9:
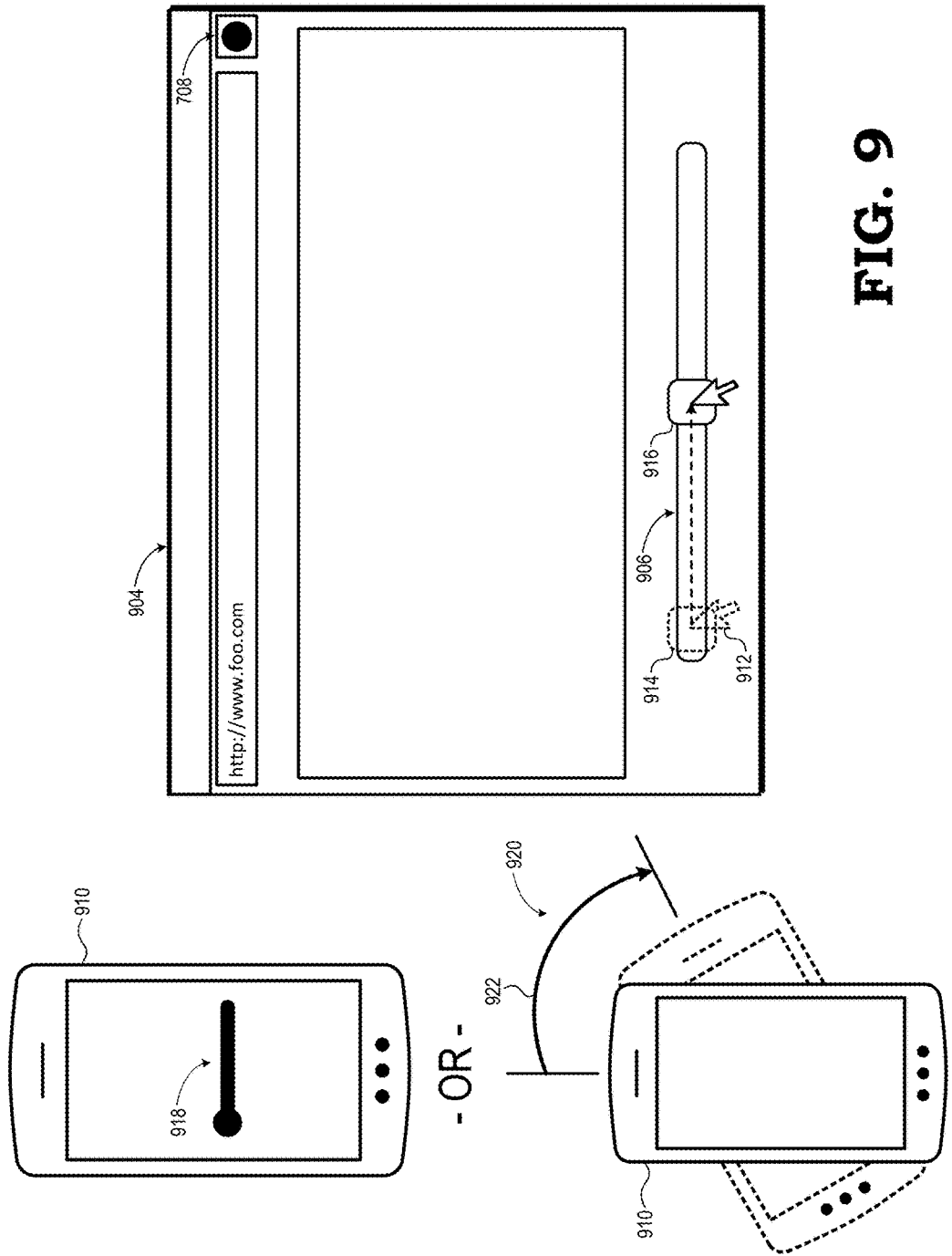
FIG. 9 is a diagram illustrating an example user demonstration of a UI action having one degree of freedom and a corresponding user demonstration of a touchscreen-based gesture to be mapped to the UI action in accordance with at least one embodiment of the present disclosure.
Figure 10:
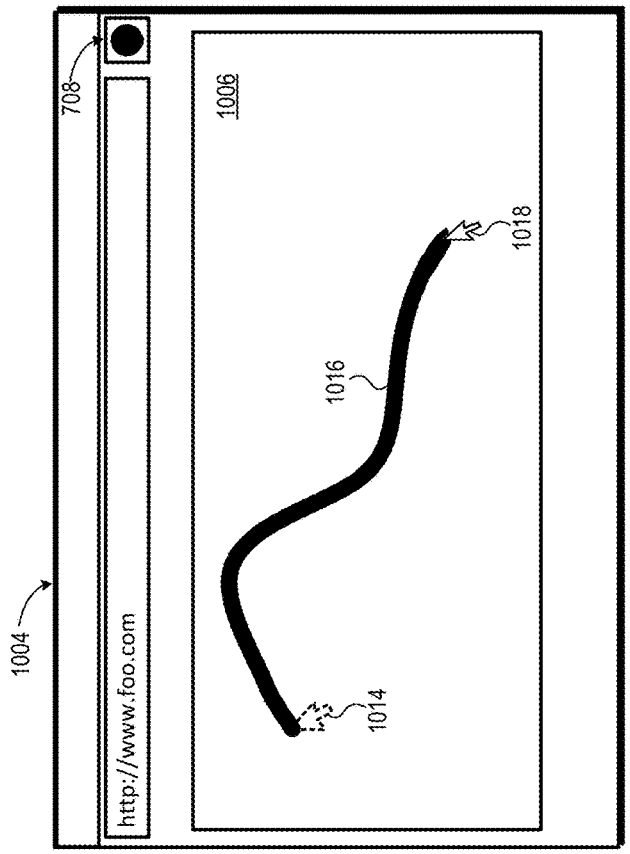
FIG. 10 is a diagram illustrating an example user demonstration of a UI action having two degrees of freedom and a corresponding user demonstration of a touchscreen-based gesture to be mapped to the UI action in accordance with at least one embodiment of the present disclosure.
Figure 10:
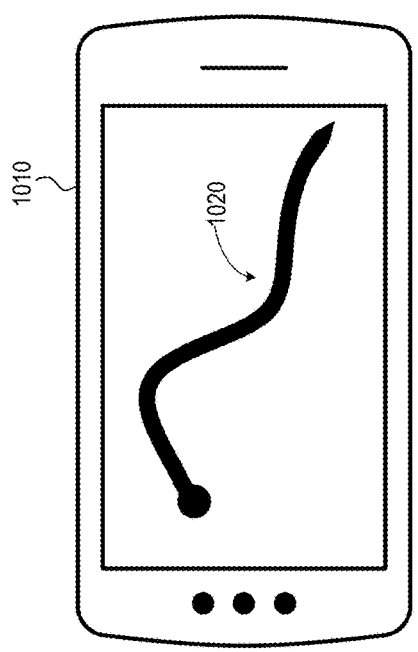

FIGS. 8-10 illustrate example pairings of UI actions and accessory device gestures in the context of the web browser application/browser extension configuration of the cross-device interaction process described above. In particular, FIG. 8 illustrates an example for gesture mapping a UI action having 0 DOF, FIG. 9 illustrates an example for gesture mapping a UI action having 1 DOF, and FIG. 10 illustrates an example for gesture mapping a UI having 2 DOF.

In the example depicted in FIG. 8, the web browser application 704 is executed on a notebook computer connected to a projector and implements a slideshow application 804 in which the display of slides is advanced or reversed in response to the user's selection of a forward button 806 and a back button 808. Not wanting to be tethered to the notebook computer while making a presentation using the slideshow application, the user registers the user's smartphone 810 with the browser extension implementing the cross-device interface module 112 so as to facilitate control of the slideshow application via the smartphone 810. Thus, to trigger the slideshow application to advance forward one slide, the user uses the GUI 710 to demonstrate the UI action of the user manipulating a mouse to move a cursor 812 to the position of the forward button 806 and then clicking a mouse button to signal the selection of the forward button 806. The mouse click of the forward button 806 is detected by the event listener attached to the forward button 806 UI element, and thus logged by the cross-device interface module 112 as the UI input event representing the UI action. This is a discrete UI action (that is, having 0 DOF), and thus the UI input event of selecting the forward button 806 is recorded as the UI action model for this UI action.

The user then demonstrates a gesture using the smartphone 810 that the user intends to be the trigger for performing the UI action of selecting the forward button 806. For example, the user may demonstrate a two-finger touch gesture 814 on the touchscreen of the smartphone 810. As another example, the user may demonstrate a particular touch pattern 816 on the touchscreen of the smartphone 810, with the resulting touch pattern 816 thus representing a symbolic gesture. In either instance, the demonstrated gesture is detected and mapped to the UI action. Thus, at run time, when the user again performs the two finger touch gesture 814, or the touch pattern 816, the browser extension detects the indicated gesture from the sensor data supplied from the smartphone 810 and thus triggers emulation of the UI action by injecting the mouse click input element into the UI of the web browser 804, and thus triggering the web browser 804 to react accordingly; that is, advance the slide presentation by one slide.

In the example depicted in FIG. 9, the web browser application 704 is executed on desktop computer and implements a web application 904 having a horizontal slider element 906 that controls a corresponding property of an object managed by the web application 904. To remotely control this horizontal slider element, the user registers the user's smartphone 910 with the browser extension implementing the cross-device interface module 112. To configure control of the adjustment of the position of the horizontal slider element 906, the user uses the GUI 710 to demonstrate the UI action of the user manipulating a mouse to move a cursor 912 to an initial position 914 of the horizontal slider element 906, engaging a mouse button, and while the mouse button is engaged, moving the mouse to the right, and thus moving the cursor 912 and the horizontal slider element 906 to the right to a final position 916. This UI behavior is detected by the event listener attached to the horizontal slider element 906, and thus logged by the cross-device interface module 112 one more UI input events representing the repositioning of the horizontal slider element 906. This is a continuous UI action having 1 DOF (that is, the horizontal position is variable), and thus one corresponding salient property of the gesture will need to be extracted and mapped to this variable.

For example, the user may demonstrate a gesture 918 whereby the user drags a finger horizontally across the touchscreen of the smartphone 910. The cross-device interface module 112 thus may identify the horizontal translation 919 present in the sensor data of the touchscreen as the salient property of the gesture that is mapped to the horizontal displacement of the horizontal slider element 906. As another example, the user may demonstrate a gesture 920 whereby the user rotates the smartphone 910 about a horizontal axis. In this case, the cross-device interface module 112 may identify the rotational displacement 922 represented through the sensor data of a gyroscope as the salient property of the gesture that is to be mapped to the horizontal displacement of the horizontal slider element 906. The ratio of touch displacement or rotational displacement to slider displacement may be adjusted, for example, using the sensitivity property of the GUI 710 as described above In either instance, the demonstrated gesture is detected and mapped to the UI action. Thus, at run time, when the user again performs the horizontal touch slide gesture 918, or the rotational gesture 920, the browser extension detects the indicated gesture from the sensor data supplied from the smartphone 910 and thus triggers emulation of the UI action by injecting UI input events into the UI of the web browser so that the web browser effects a repositioning of the horizontal slider element 906 by an degree proportional to the degree of horizontal translation/rotational translation extracted from the detected gesture.

In the example depicted in FIG. 10, the web browser application 704 is executed on a tablet computer and implements a web application 1004 having a drawing window 1006 in which the user may manipulate a touchscreen or cursor (via a mouse) to draw lines and other freeform drawing elements. To remotely enable drawing in this web application 1004, the user registers the user's smartphone 1010 with the browser extension implementing the cross-device interface module 112. To configure control of the cursor as it moves in the X and Y directions in the drawing window 1006, the user uses the GUI 710 to demonstrate the UI action of the user manipulating a mouse or touchscreen to move a cursor to an initial position 1014 in the drawing window 1006, engaging a mouse button or making initial contact with the touchscreen, and while the mouse button is engaged or contact with the touchscreen is maintained, moving the mouse/user finger in a non-linear path so as to move the cursor along the same path to a final position 1018, at which point the mouse button is disengaged or contact with the touchscreen is removed. This UI behavior is detected by the event listener attached to the drawing window 1006, and thus logged by the cross-device interface module 112 as one more UI input events representing the this sequence of UI input events.

As there is no linear or rotational correlation in the X and Y positions during this movement (as discussed above with reference to Equations 1 and 2), the cross-device interface module 112 identifies the demonstrated UI action as a continuous UI action having 2 DOF (that is, the vertical and horizontal positions both are variable), and thus two corresponding salient properties of the gesture will need to be extracted and mapped to these two variables.

As for the intended gesture, in this example the user may demonstrate a gesture 1020 whereby the user drags a finger along a similar non-linear path on the touchscreen of the smartphone 1010. The cross-device interface module 112 thus may identify both the changes in the X direction and the Y direction present in the sensor data of the touchscreen as the salient properties of the gesture that are mapped to the X displacement and Y displacement of the cursor in the drawing window 1006 when emulating an instance of the UI action. The ratio of touch displacement drawing displacement may set as proportional to the relative dimensions of the touchscreen to the draw window 1006, and subsequently may be adjusted, for example, using the sensitivity property of the GUI 710 as described above. As such, the demonstrated gesture 1020 is detected and mapped to the UI action. Thus, at run time, when the user again moves a finger along the touchscreen of the smartphone 1010, the browser extension detects the indicated gesture from the sensor data supplied from the smartphone 1010 and thus triggers emulation of initiating the creation of freeform line and moving the drawing cursor for the line in the draw window 1006 in a manner proportional to the movement of the user's finger by injecting corresponding UI input events into the UI of the web browser.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any property(s) that may cause any benefit, advantage, or solution to occur or become more pronounced are not to be construed as a critical, required, or essential property of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    determining a type of user interface action demonstrated by a user for an application executed at a first device, the type of user interface action being one of a discrete user interface action type having no variables, a translation/rotation user interface action type having one variable, or a freeform user interface action type having at least two variables;
    identifying a gesture intended by the user to trigger the user interface action based on sensor data received from one or more gesture-related sensors of a second device during observation of a user's demonstration of the gesture using the second device during a gesture demonstration operation;
    identifying a number of parameters to be obtained from the gesture based on the type of user interface action, wherein the number of parameters to be obtained from the gesture is zero when the type of user interface action is the discrete user interface action type, one when the type of user interface action is the translation/rotation user interface action type, and two or more when the type of the user interface action is the freeform user interface action type; and in response to detecting performance of the gesture using the first device subsequent to the demonstration of the gesture:
determining, based on the performance of the gesture, a respective value for each parameter of the number of parameters; and
emulating the user interface action for the application at the second device based on the respective value for each parameter of the number of parameters.

2. The method of claim 1, wherein determining the type of the user interface action demonstrated includes monitoring at least one user input device, wherein the at least one user input device is at least one of: a mouse, a keyboard, or a touchscreen.

3. The method of claim 1, wherein the one or more gesture-related sensors include at least one of: a touchscreen, a gyroscope, a magnetometer, or an accelerometer.

4. The method of claim 1, wherein determining the value of each parameter of the number of parameters comprises:
selecting, based on a selection criterion, a portion of the sensor data received from the one or more gesture-related sensors of the second device, the selection criterion including at least one of: a degree of variability in the sensor data, a specified sensor prioritization, or an ergonomic model of a use of the second device; and
mapping the portion of the sensor data to the corresponding parameter.

5. The method of claim 1, wherein emulating the user interface action for the application at the second device includes configuring a magnitude of at least one parameter of the user interface action based on the respective value for at least one of the number of parameters.

6. A device comprising:
at least one processor;
a memory storing instructions executable by the at least one processor to:
determine a type of user interface action demonstrated by a user for an application executed at a first device, the type of user interface action being one of a discrete user interface action type having no variables, a translation/rotation user interface action type having one variable, and a freeform user interface action type having at least two variables;
identify a gesture intended by the user to trigger the user interface action based on sensor data received from one or more gesture-related sensors of a second device during observation of a user's demonstration of the gesture using the second device during a gesture demonstration operation;
identify a number of parameters to be obtained from the gesture based on the type of user interface action, wherein the number of parameters to be obtained from the gesture is zero when the type of user interface action is the discrete user interface action type, one when the type of user interface action is the translation/rotation user interface action type, and two or more when the type of the user interface action is the freeform user interface action type; and
in response to detecting performance of the gesture using the first device subsequent to the demonstration of the gesture:
determine, based on the performance of the gesture, a respective value for each parameter of the number of parameters; and
emulate the user interface action for the application at the second device based on the respective value for each parameter of the number of parameters.

7. The device of claim 6, wherein the instructions are further executable by the at least one processor to determine the value of each parameter of the number of parameters by at least being executable to:
select, based on a selection criterion, a portion of the sensor data received from the one or more gesture-related sensors of the second device, the selection criterion including at least one of: a degree of variability in the sensor data, a specified sensor prioritization, or an ergonomic model of a use of the second device; and
map the portion of the sensor data to the corresponding parameter.

8. The device of claim 6, wherein the instructions are further executable by the at least one processor to emulate the user interface action for the application at the second device by at least being executable to:
configure a magnitude of at least one parameter of the user interface action based on the respective value for at least one of the number of parameters.

9. The device of claim 6, wherein the instructions are further executable by the at least one processor to determine the type of the user interface action demonstrated by at least being executable to monitor at least one user input device, wherein the at least one user input device is at least one of: a mouse, a keyboard, or a touchscreen.

10. The device of claim 6, wherein the one or more gesture-related sensors include at least one of: a touchscreen, a gyroscope, a magnetometer, or an accelerometer.

11. A non-transitory computer-readable storage medium storing instructions that, when executed, cause one or more processors of a computing device to:
determine a type of user interface action demonstrated by a user for an application executed at a first device, the type of user interface action being one of a discrete user interface action type having no variables, a translation/rotation user interface action type having one variable, and a freeform user interface action type having at least two variables;
identify a gesture intended by the user to trigger the user interface action based on sensor data received from one or more gesture-related sensors of a second device during observation of a user's demonstration of the gesture using the second device during a gesture demonstration operation;
identify a number of parameters to be obtained from the gesture based on the type of user interface action, wherein the number of parameters to be obtained from the gesture is zero when the type of user interface action is the discrete user interface action type, one when the type of user interface action is the translation/rotation user interface action type, and two or more when the type of the user interface action is the freeform user interface action type; and
in response to detecting performance of the gesture using the first device subsequent to the demonstration of the gesture:
determine, based on the performance of the gesture, a respective value for each parameter of the number of parameters; and emulate the user interface action for the application at the second device based on the respective value for each parameter of the number of parameters.

12. The non-transitory computer-readable storage medium of claim 11, wherein the instructions further cause the one or more processors to determine the value of each parameter of the number of parameters by at least being executable to:
  select, based on a selection criterion, a portion of the sensor data received from the one or more gesture-related sensors of the second device, the selection criterion including at least one of: a degree of variability in the sensor data, a specified sensor prioritization, or an ergonomic model of a use of the second device; and
  map the portion of the sensor data to the corresponding parameter.

13. The non-transitory computer-readable storage medium of claim 11, wherein the instructions further cause the one or more processors to emulate the user interface action for the application at the second device by at least being executable to:
  configure a magnitude of at least one parameter of the user interface action based on the respective value for at least one of the number of parameters.

14. The non-transitory computer-readable storage medium of claim 11, wherein the instructions further cause the one or more processors to determine the type of the user interface action demonstrated by at least being executable to monitor at least one user input device, wherein the at least one user input device is at least one of: a mouse, a keyboard, or a touchscreen.

15. The non-transitory computer-readable storage medium of claim 11, wherein the one or more gesture-related sensors include at least one of: a touchscreen, a gyroscope, a magnetometer, or an accelerometer.

* * * * *